United States Patent [19]

Lin

[11] Patent Number: 5,687,820

[45] Date of Patent: Nov. 18, 1997

[54] REVERSIBLE RATCHET MECHANISM

[76] Inventor: Ching-Chou Lin, No. 148, Section 3, Chong San Road, Wu Jih Hsiang, Taichung Hsien, Taiwan

[21] Appl. No.: 624,167

[22] Filed: Mar. 29, 1996

[51] Int. Cl.⁶ .............................. F16D 41/16; B25B 13/46
[52] U.S. Cl. ........................................ 192/43.2; 81/63.1
[58] Field of Search ...................... 192/43.2, 43; 81/63.1, 81/60

[56] References Cited

U.S. PATENT DOCUMENTS 4,777,852  10/1988  Herman et al. ................... 81/63.1 X
5,570,616  11/1996  Thompson et al. ................ 192/43.2 X
5,582,081  12/1996  Lin ................................... 81/63.1
5,609,078  3/1997   Yang ................................. 192/43.2 X Primary Examiner—Andrea L. Pitts
Attorney, Agent, or Firm—Charles E. Baxley, Esq.

[57] ABSTRACT

A ratchet mechanism includes a block secured in a handle and having a bore for receiving a rod and having two channels for receiving two pawls. The block has two projections extended inward of a slot. A sleeve is secured on the rod and includes a gear for engaging with the pawls. A disc includes an extension for disengaging either of the pawls from the gear so as to control the active directions of the ratchet mechanism. An arm has two legs engaged with the disc and engaged in the slot and engaged with the projections so as to retain the disc relative to the block at three positions.

4 Claims, 2 Drawing Sheets

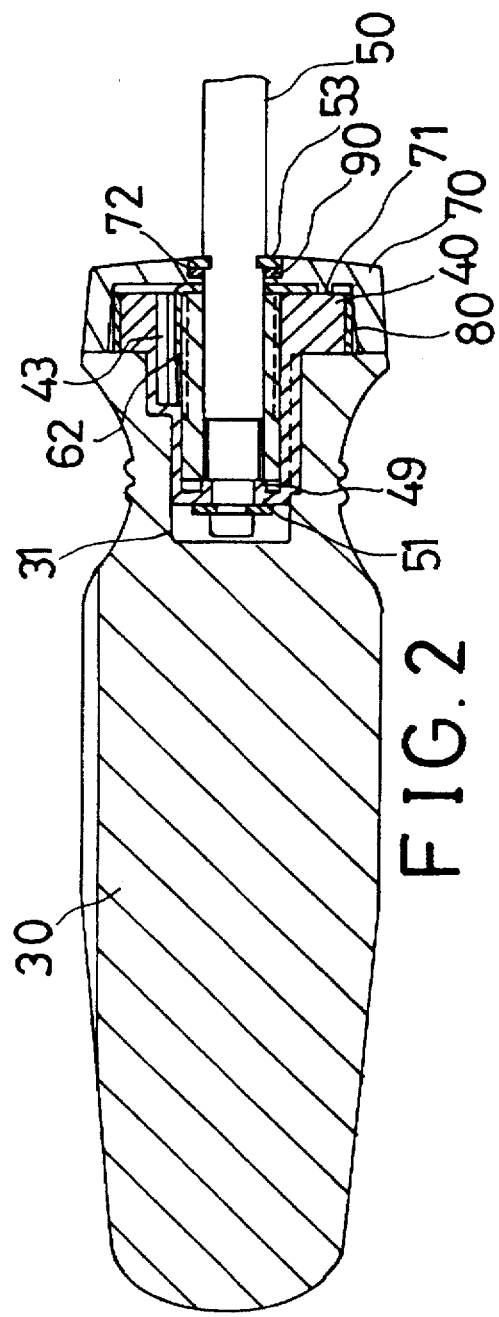
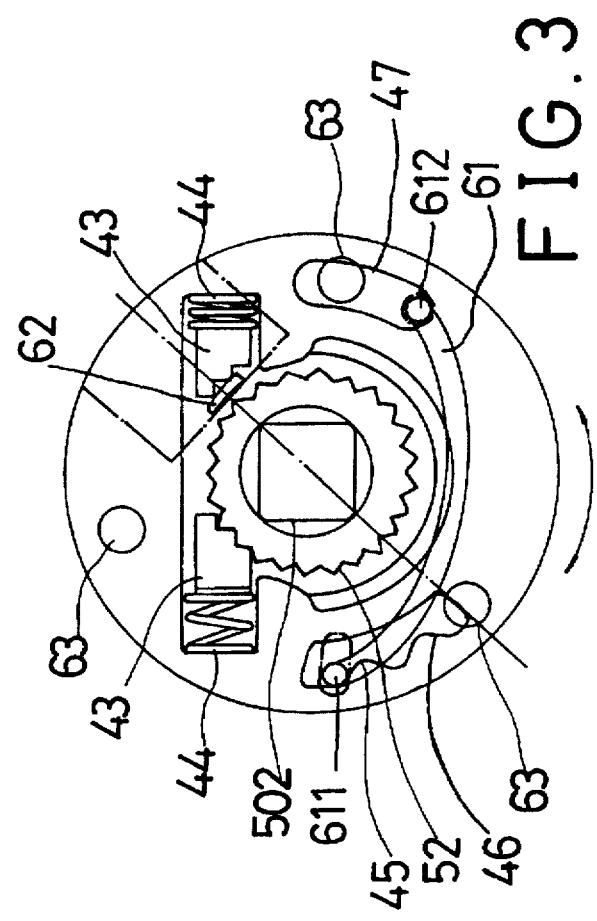

REVERSIBLE RATCHET MECHANISM

BACKGROUND OF THE INVENTION

1. Field of the Invention

The present invention relates to a ratchet mechanism, and more particularly to a reversible ratchet mechanism.

2. Description of the Prior Art

A typical reversible ratchet mechanism is disclosed in U.S. Pat. No. 4,777,852 to Herman et al., issued on Oct. 18, 1988. In this patent, an L-shaped actuator is actuated to control a pair of pawls so as to control the actuating direction of the ratchet mechanism. However, the L-shaped actuator may not be effectively operated and controlled.

The present invention has arisen to mitigate and/or obviate the afore-described disadvantages of the conventional ratchet mechanisms.

SUMMARY OF THE INVENTION

The primary objective of the present invention is to provide a ratchet mechanism which may be effectively operated and controlled.

In accordance with one aspect of the invention, there is provided a ratchet mechanism comprising a handle including a cavity and a slit formed therein and communicating with each other, a block secured in the cavity of the handle and including a rib for engaging with the slit so as to prevent the block from rotating relative to the handle, the block including a bore formed therein and including two channels communicating with the bore, the block including a slot and a groove formed therein and including two projections extended inward of the slot so as to define three positions, a rod including a first end rotatably engaged in the bore of the block, a sleeve engaged in the bore of the block and secured on the rod so as to be rotated in concert with the rod, the sleeve including a gear formed thereon, two pawls engaged in the channels, spring means engaged in the channels for biasing the pawls to engage with the gear, a disc engaged with the block and including an extension extended inward of the bore for engaging with the pawls and for disengaging the pawls from the gear, the disc including two holes formed therein, an arm including two legs engaged in the slot and the groove respectively, a first of the legs being engaged with the projections so as to be engaged in at least one of the three positions, a control ferrule rotatably engaged on the rod and secured to the disc so as to be rotated in concert with the control ferrule, and means for securing the control ferrule to the rod and the handle. The extension of the disc is rotated by the control ferrule in order to disengage at least one of the pawls from the gear so as to control an acting direction of the rod, and both of the pawls are engaged with the gear when the extension is engaged between the pawls.

The rod includes a square segment formed in the first end thereof, the sleeve includes a square hole formed therein for engaging with the square segment of the rod so as to allow the sleeve to be rotated in concert with the rod.

A ring is engaged between the block and the handle for reinforcing the handle.

The disc includes at least one aperture formed therein, the control ferrule includes at least one bulge for engaging with the aperture such that the disc rotates in concert with the control ferrule.

Further objectives and advantages of the present invention will become apparent from a careful reading of a detailed description provided hereinbelow, with appropriate reference to accompanying drawings.

BRIEF DESCRIPTION OF THE DRAWINGS

FIG. 2 is a cross sectional view of the ratchet mechanism; and

FIG. 3 is a schematic view illustrating the operation of the ratchet mechanism.

DETAILED DESCRIPTION OF THE PREFERRED EMBODIMENT

Figure 1:
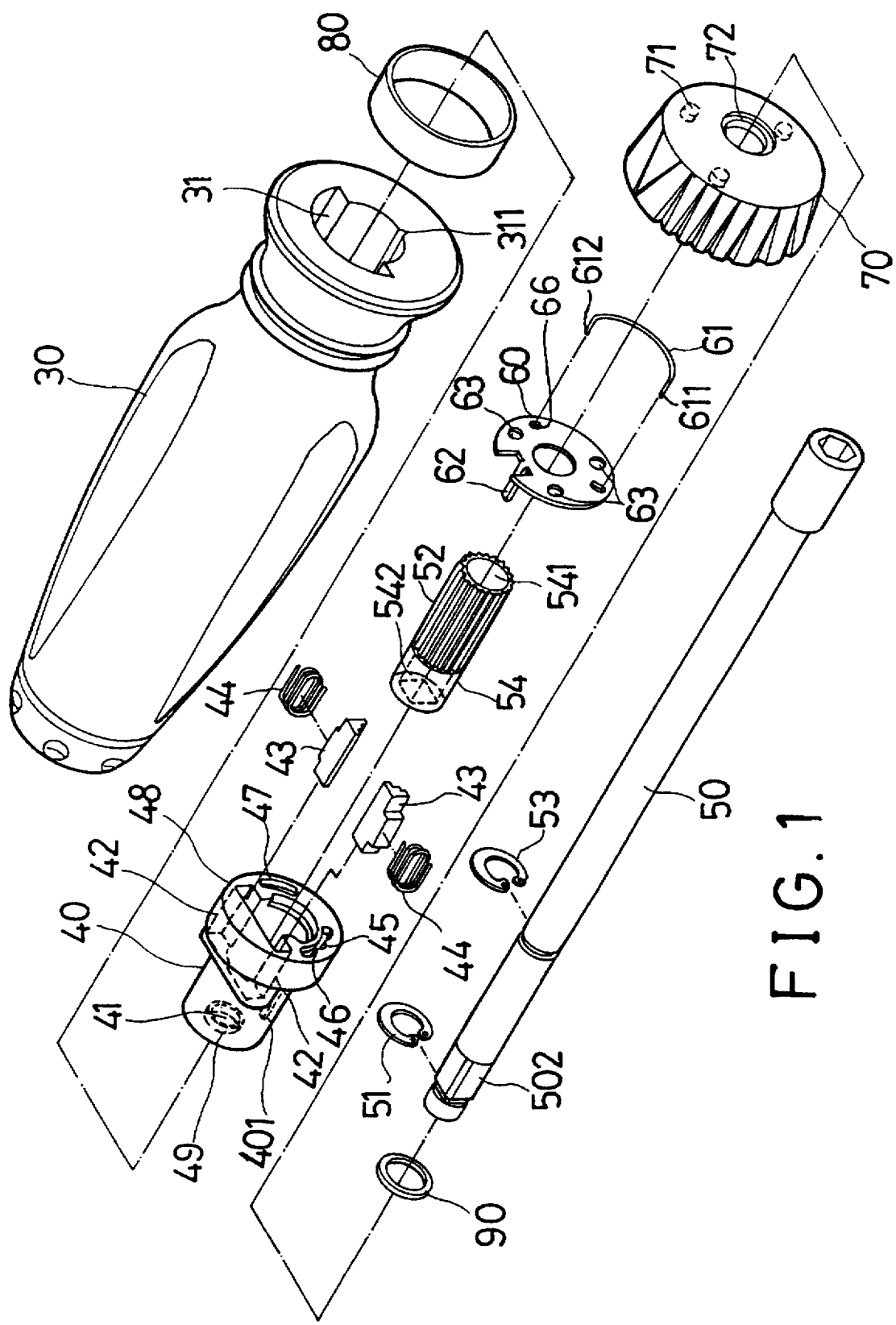
FIG. 1 is an exploded view of a ratchet mechanism in accordance with the present invention.

Referring to the drawings, and initially to FIGS. 1 and 2, a ratchet mechanism in accordance with the present invention comprises a handle 30 including a cavity 31 and a slit 311 formed therein and communicating with each other. A block 40 is secured in the cavity 31 of the handle 30 and includes a rib 401 for engaging with the slit 311 so as to prevent the block 40 from rotating relative to the handle 30. The block 40 includes a bore 41 formed therein for receiving a rod 50 therein and includes a hub 49 for rotatably engaging with and for supporting the end portion of the rod 50. A sleeve 54 is engaged in the bore 41 of the block 40 and includes an orifice 541 for engaging with the rod 50. The sleeve 54 includes a square hole 542 formed in one end for engaging with a square segment 502 of the rod 50 such that the sleeve 54 rotates in concert with the rod 50. A clamping ring 51 is secured to the end portion of the rod 50 and engaged with the block 40 so as to secure the rod 50 to the block 40 and so as to prevent the rod 50 from disengaging from the block 40. The sleeve 54 includes a gear 52 formed thereon.

The block 40 includes two channels 42 formed therein and communicating with the bore 41 of the block 40 for receiving two pawls 43 and two springs 44 therein respectively. The springs 44 may bias the pawls 43 to engage with the gear 52, best shown in FIG. 3. The block 40 includes a slot 45 formed therein and two projections 46 extended inward of the slot 45, and includes a groove 47 formed therein. A ring 80 is engaged on one end of the block 40 for reinforcing the strength of the block 40 and the handle 30. A disc 60 is engaged with the block 40 and includes an extension 62 extended inward of the bore 41 and engagable in the channels 42 for engaging with the pawls 43 and for disengaging the pawls 43 from the gear 52. The disc 60 includes three apertures 63 formed therein and includes two holes 66 formed therein for engaging with two legs 611, 612 of an arm 61. The legs 611, 612 of the arm 61 are engaged in the slot 45 and the groove 47 respectively. A control ferrule 70 is rotatably engaged on the rod 50 and includes three bulges 71 for engaging with the apertures 63 of the disc 60 such that the disc 60 rotates in concert with the control ferrule 70 and such that the disc 60 may be rotated by the control ferrule 70. The control ferrule 70 includes an annular shoulder 72 formed therein for engaging with a washer 90 and a clamping ring 53 which is secured to the rod 50 for securing the control ferrule 70 to the rod 50 and the handle 30.

In operation, the disc 60 and the arm 61 may be rotated by the control ferrule 70 such that the extension 62 may also be rotated by the control ferrule 70 in order to actuate the pawls 43 so as to disengage either of the pawls 43 from the gear 52, best shown in FIG. 3. As shown in FIG. 3, when the disc 60 is rotated clockwise, one end 611 of the arm 61 may be engaged in one end of the slot 45 and engaged with the projection 46 of the block 40 so as to retain the disc 60 at the clockwise position relative to the handle 30 such that the right pawl 43 may be maintained in the disengagement position from the gear 52. At this moment, the gear 52 and the sleeve 54 and the rod 50 may be rotated in one direction relative to the handle 30. On the contrary, when the disc 60 is rotated counterclockwise in order to engage the one end of the arm 61 in the other end of the slot 45, the left pawl 43 may be disengaged from the gear 52 by the extension 62 and the right pawl 43 may be biased to engage with the gear 52 such that the gear 52 and the rod 50 may be rotated in the reverse direction relative to the handle 30. When the extension 62 is rotated to a center position between the pawls 43, both the pawls 43 are biased to engage with the gear 52 such that the rod 50 is locked and may not be rotated in both directions. At this moment, the end 611 of the arm 61 is engaged in the middle portion of the slot 45.

Accordingly, the ratchet mechanism in accordance with the present invention includes a disc 60 having an extension 62 that may effectively actuate the pawls 43 so as to control the engagement between the pawls 43 and the gear 52. In addition, an arm 61 includes two legs 611, 612 for engaging with the slot 45 and the groove 47 and for engaging with the projection 46 so as to maintain the disc 60 at a clockwise position, a middle position and a counterclockwise position.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A ratchet mechanism comprising:

a handle including a cavity and a slit formed therein and communicating with each other, a block secured in said cavity of said handle and including a rib for engaging with said slit so as to prevent said block from rotating relative to said handle, said block including a bore formed therein and including two channels communicating with said bore, said block including a slot and a groove formed therein and including two projections extended inward of said slot so as to define three positions, a rod including a first end rotatably engaged in said bore of said block, a sleeve engaged in said bore of said block and secured on said rod so as to be rotated in concert with said rod, said sleeve including a gear formed thereon, two pawls engaged in said channels, spring means engaged in said channels for biasing said pawls to engage with said gear, a disc engaged with said block and including an extension extended inward of said bore for engaging with said pawls and for disengaging said pawls from said gear, said disc including two holes formed therein, an arm including two legs engaged in said slot and said groove respectively, a first of said legs being engaged with said projections so as to be engaged in at least one of said three positions, a control ferrule rotatably engaged on said rod and secured to said disc so as to be rotated in concert with said control ferrule, and means for securing said control ferrule to said rod and said handle, said extension of said disc being rotated by said control ferrule in order to disengage at least one of said pawls from said gear so as to control an acting direction of said rod, and both of said pawls being engaged with said gear when said extension is engaged between said pawls.

2. A ratchet mechanism according to claim 1, wherein said rod includes a square segment formed in said first end thereof, said sleeve includes a square hole formed therein for engaging with said square segment of said rod so as to allow said sleeve to be rotated in concert with said rod.

3. A ratchet mechanism according to claim 1 further comprising a ring engaged between said block and said handle for reinforcing said handle.

4. A ratchet mechanism according to claim 1, wherein said disc includes at least one aperture formed therein, said control ferrule includes at least one bulge for engaging with said aperture such that said disc rotates in concert with said control ferrule.

* * * * *